Figure 1:
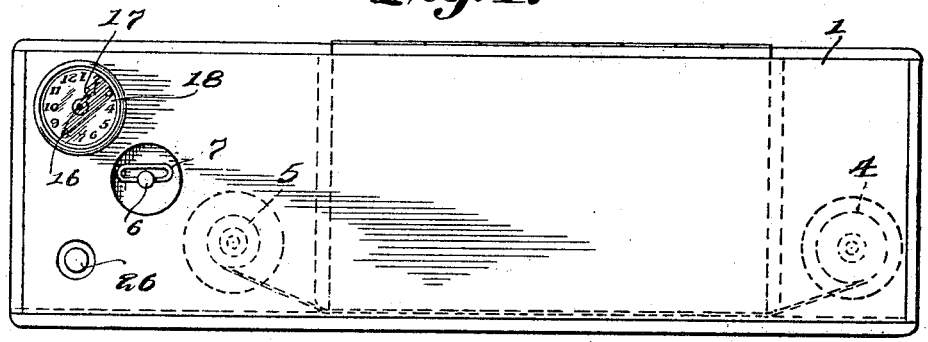

R. N. WILKINSON, Jr.
BRAKE FOR AUTOMATIC FILM ROLLERS.
APPLICATION FILED JAN. 4, 1916.

1,210,241.

Patented Dec. 26, 1916.
2 SHEETS—SHEET 1.

Witnesses
A. H. Lybrand
I. C. Wilcox

Inventor
Ross N. Wilkinson, Jr.
By Victor J. Evans
Attorney

R. N. WILKINSON, Jr.
BRAKE FOR AUTOMATIC FILM ROLLERS.
APPLICATION FILED JAN. 4, 1916.
1,210,241.
Patented Dec. 26, 1916.
2 SHEETS—SHEET 2.
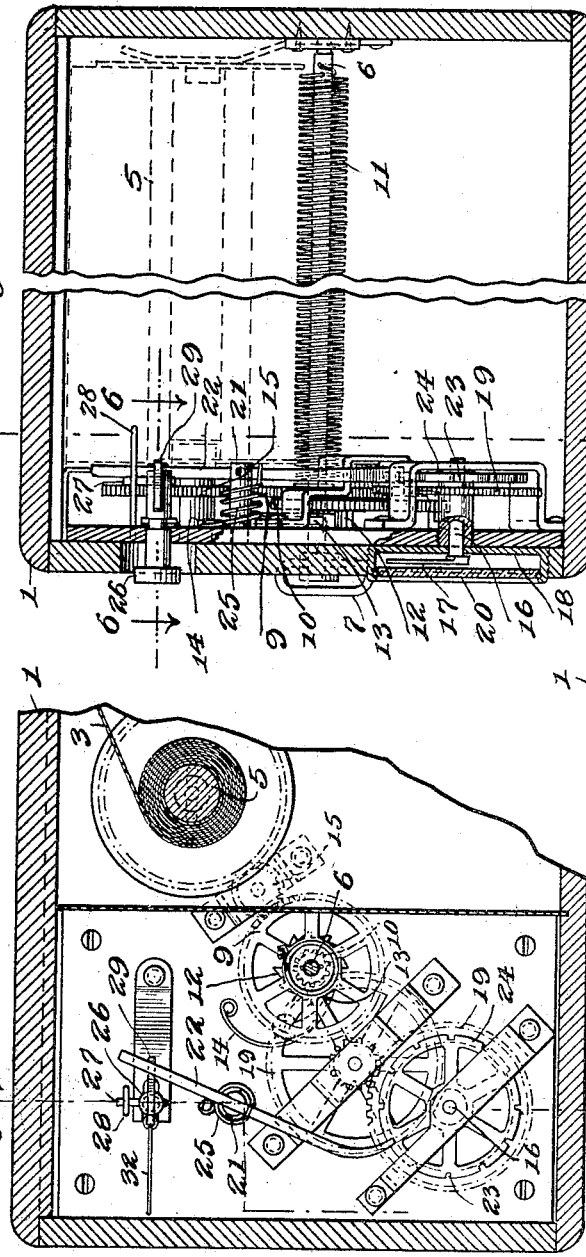
Witnesses
A. H. Lybrand
L. C. Wilcox.
Inventor
Ross N. Wilkinson, Jr.
By Victor J. Evans
Attorney

UNITED STATES PATENT OFFICE.

ROSS N. WILKINSON, JR., OF LINCOLN, NEBRASKA.

BRAKE FOR AUTOMATIC FILM-ROLLERS.

1,210,241.  Specification of Letters Patent.  Patented Dec. 26, 1916.

Application filed January 4, 1916. Serial No. 70,102.

*To all whom it may concern:*

Be it known that I, ROSS N. WILKINSON, Jr., a citizen of the United States, residing at Lincoln, in the county of Lancaster and State of Nebraska, have invented new and useful Improvements in Brakes for Automatic Film-Rollers, of which the following is a specification.

This invention relates to automatic film rollers for photographic cameras and it consists in the novel features hereinafter described and claimed.

An object of the invention is to provide a power operated film roller of the character stated which is adapted to move a section of the film in alinement or position with relation to the cone of light of the camera whereby an exposure may be had upon the said section of the film when the shutter controlling device of the camera is manipulated.

A further object of the invention is to provide in combination with means as stated, means for indicating or registering the number of sections of the film which has been exposed or used thus avoiding the annoyance and trouble incident to making two or more exposures upon the same section of the film. Also the device may be readily consulted to determine at a glance exactly how many film sections remain unexposed in the roll and this without requiring the necessity of the operator peering through the usual aperture provided in the body of the camera to observe the numbers which are usually placed upon the sections of the film.

With these objects in view the structure includes a camera body in which the film roller may be journaled there being provided in the body of the camera a roller upon which the film is adapted to be wound, a spring actuated shaft is journaled in the body of the camera and a pawl and ratchet means is provided for connecting the said shaft with a train of gear wheels which lead to the roller upon which the film is wound. Another train of gear wheels operatively connect the said shaft with the said indicating means and a trip mechanism of a special construction and design is provided for normally or temporarily holding the said mechanisms at state of rest. The said trip mechanism may be actuated to release the shaft and the trains of gear wheels whereby a section of the film may be wound upon said roller provided for its reception and the pointer of the indicating mechanism moved over the dial thereof.

Figure 2:
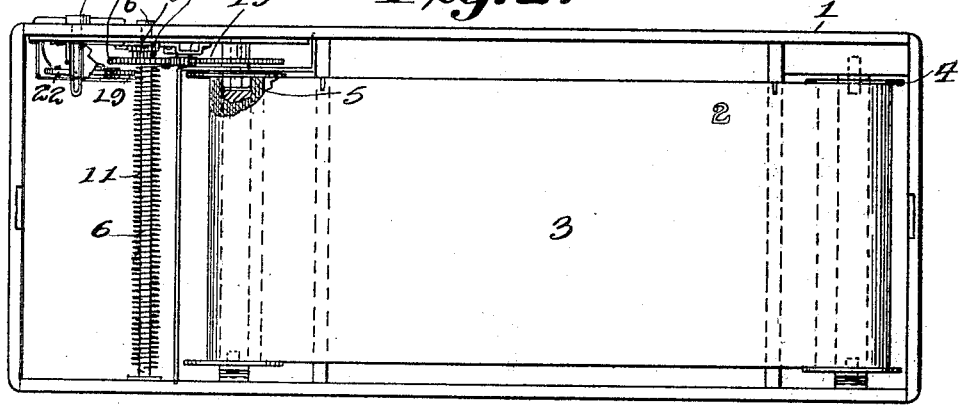
Figure 3:
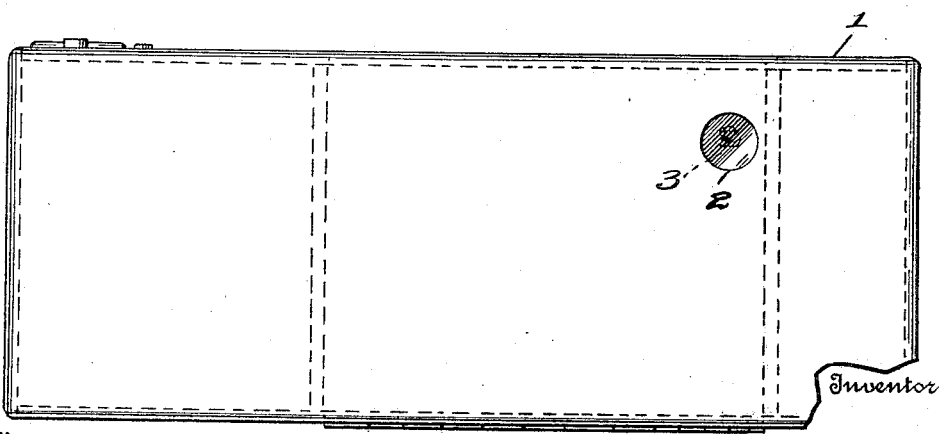

In the accompanying drawings; Figure 1 is a top plan view of the camera equipped with the automatic film roller. Fig. 2 is a side view of the camera with a side thereof removed showing the film roller with parts broken away and parts in section. Fig. 3 is a side elevation of the camera body. Fig. 4 is a transverse sectional view of a portion of the camera taken on the line 4—4 of Fig. 5. Fig. 5 is a similar view taken on the line 5—5 of Fig. 4, showing concealed parts in dotted lines. Fig. 6 is a detail sectional view of a portion of the camera taken on the line 6—6 of Fig. 5.

The camera to which the device is applied comprises a body 1 having at one side an opening 2 through which the numerals or characters usually mounted upon the film 3 may be observed when the numerals or characters are brought to view through the opening as best illustrated in Fig. 3 of the drawing. A film roller 4 is journaled in the body 1 in the usual manner and the said film 3 is initially wound upon the roller 4 but may be unwound therefrom. The roller 5 is journaled in the body 1 and the film 3 is connected with the roller 5 and arranged to wind upon the roller 5 as it unwinds from the roller 4 and its intermediate portion or section moved transversely across the line of the cone of light of the camera and each said section of the film 3 successively remains in a stationary position in alinement with the cone of light as will be hereinafter explained.

A shaft 6 is journaled in the body 1 and one end of the said shaft passes through one side of the said body and is provided with a pivoted handle 7 of usual configuration. Gear wheels 9 and 10 are journaled upon the shaft 6 and are connected together in any suitable manner to rotate simultaneously. A coil spring 11 is connected at one end with the shaft 6 and at its other end with the gear wheel 9 shown in Fig. 2 of the drawings. A ratchet wheel 12 is fixed with relation to the shaft 6 and a pawl 13 (see Fig. 4) is pivoted at the inner side of the body 1 and engages the teeth of the ratchet wheel 12. A spring 14 is secured to the side of the body 1 and at its free end bears against the pawl 13 and is under tension with a tendency to hold the free end of the pawl 13 in engagement with the teeth of the ratchet wheel 12. A train of gear wheels 15 operatively connect the gear wheel 9 to the shaft of the roller 5. An arbor 16 is journaled in the side of the body 1 and is provided at its outer end with an indicator arm or finger 17. The said arm or finger 17 is arranged to move over a dial 18 which is mounted at the side of the body 1 and which may be provided with suitable numerals or characters. As shown in Fig. 1 of the drawings the characters upon the dial 18 are arranged successively in a circle from 1 to 12 inclusive but it is to be understood that any other consecutive arrangement of characters or figures may be employed as ranging from zero to twelve or from zero to any other number or figure which may indicate the number of sections included in the film 3. A train of gear wheels 19 operatively connect the gear wheel 10 with the arbor 16. The indicator arm or finger 17 and the dial 18 are covered by a glass 20 shown in Fig. 5 of the drawings.

In conjunction with the features hereinbefore described a catch mechanism for holding the gear wheels against turning movement, is provided. The said catch mechanism is susceptible of operation whereby it will relieve the said trains of gear wheels so that the roller 5 and the indicator arm or finger 17 are simultaneously turned. The catch mechanism includes the following instrumentalities. A post 21 is mounted at the side of the body 1 and a lever 22 is fulcrumed upon the said post. One end of the lever 22 is adapted to engage in the notches 23 of a wheel 24 which is fixed to the arbor 16. A spring 25 is connected at one end with the side of the body 1 and at its other end with the lever 22 and is under tension with a tendency to hold the end of the lever 22 toward the wheel 24 and in engagement with one of the notches 22 thereof when the wheel 24 is held against rotation. A button 26 is slidably mounted in the side of the body 1 and carries at its inner end a pin 27 which is slidably received in a guide 28 whereby the button 26 is held against turning movement. A pawl 29 is pivotally mounted at the inner end of the button 26 and the said pawl is provided with a pointed portion 30 adjacent which is located the notch 31 as best shown in Fig. 6 of the drawings. A spring 32 is attached at one end to the body 1 and at its other end to the pawl 30 and is under tension with a tendency to normally maintain one edge of the pawl 29 in engagement with the shank of the button 26 as best indicated in Fig. 6 of the drawings. The upper portion of the lever 22 is disposed transversely across the pointed end portion 30 of the pawl 29 and the spring 25 is stronger than the spring 32.

Normally the spring 25 holds the lower end of the lever 22 in engagement with one of the notches 23 of the wheel 24 whereby the arbor 16 and the gear wheels are held against turning movement. At this time the pawl 29 is in the position with relation to the lever 22 as shown in Fig. 6 of the drawings. When it is desired to move a section of the film 3 across the path of the cone of light of the camera the button 26 is moved in an inward direction whereby the pawl 29 swings the lever 22 and the opposite end of the lever is carried out of engagement with that notch 23 in the wheel 24 in which it has just been engaged. This releases the arbor 16 and the gear wheels. The shaft 6 is held against turning movement and when the arbor 16 is released the tension of the spring 11 comes into play whereby the wheels 9 and 10 are rotated and through the connecting trains of gear wheels the shaft 5 is turned whereby a section of the film 3 is wound thereon and simultaneously the arbor 16 is turned and the indicator arm or finger 17 is carried over the dial 18 and assumes a position adjacent the number of next highest order of magnitude.

When the lever 22 is moved as above indicated it may flex or pass around the pointed end 30 of the pawl 29 and engage in the notch 31 of the said pawl thus when pressure is removed from the button 26 the tension of the spring 25 comes into play and returns the lever 22 to its normal position when one of the notches 23 comes into register with the end of the lever. During the return swinging movement of the lever the upper end thereof moves along the pointed portion 30 of the pawl 29 whereby the said pawl is swung upon its pivotal connection with the button 26 and as soon as the parts assume the position shown in Fig. 6 of the drawings the spring 32 returns the pawl 29 to its initial position adjacent the side of the lever 22 as shown in the said figure.

From the above description taken in conjunction with the accompanying drawings it will be seen that a film roller mechanism of simple and durable structure is provided and that the same automatically resets itself after having been operated and the indicator may be observed to ascertain the number of unused sections of the film remaining in the camera without requiring the operator to peer through the small aperture or opening 2 usually provided in the camera for observing the characters or figures upon the film sections of the camera for judging the characters or figures upon the sections of the film.

Having thus described the invention, what is claimed is:—

1. In combination with a spring actuated train of gears, a catch mechanism engageable with the said gears for holding the same against rotation, said catch mechanism including a spring actuated pivoted lever, a button movably mounted adjacent the lever, a pawl pivoted upon the button and engageable with the lever, a spring operatively engaging the pawl, the spring which operates the lever being stronger than the spring which operates the pawl.

2. In a device of the character described a train of gear wheels, spring means for turning the same, a catch mechanism for holding the gear wheels inactive, said catch mechanism including a pivoted lever, a spring engaging the lever to hold the same in position to retain the gear wheels inactive, a button slidably mounted, a pawl pivoted to the button and engageable with the lever, a spring engaging said pawl, the spring which engages the lever being stronger than the spring which engages the pawl.

3. In a device of the character described a train of gear wheels, a lever pivotally mounted, a spring engaging the lever for holding the same in a position to retain the gear wheels inactive, a button movably mounted, a pawl pivoted to the button and having a pointed edge with an adjacent notch, a pointed edge portion of the pawl adapted to engage the lever, and a spring engaging the said pawl, the spring which engages the lever being stronger than the spring which engages the pawl.

In testimony whereof I affix my signature in presence of two witnesses.

ROSS N. WILKINSON, JUNIOR.

Witnesses:
O. F. RALSTON,
H. E. BON DURANT.

Copies of this patent may be obtained for five cents each, by addressing the "Commissioner of Patents, Washington, D. C."